Patented Aug. 4, 1953

2,647,907

UNITED STATES PATENT OFFICE 2,647,907

PREPARATION OF N-CARBOXYANHYDRIDES OF GLYCINE

George A. Richardson, Dayton, Ohio, assignor to Monsanto Chemical Company, St. Louis, Mo., a corporation of Delaware No Drawing. Application June 23, 1950,
Serial No. 170,051

6 Claims. (Cl. 260—307)

This invention relates to a method of preparing N-carboxy anhydrides of amino acids. More specifically the invention relates to a new and more economical process for preparing the N-carboxyglycine anhydride.

The N-carboxy anhydride of glycine has been prepared heretofore, but the methods used are tedious and not practicable in the industrial preparation of the compound. In the practice of the prior art the amino acid is first treated with an ester of chloroformic acid in an aqueous alkaline solution, thereafter the resulting product is extracted with ether, converted to the N-carboxy anhydride by reaction with thionyl chloride, and finally extracted from the reaction mixture with a suitable solvent. This procedure is complex and low yields of impure products are obtained.

The purpose of the present invention is to provide an improved procedure for preparing N-carboxyglycine anhydride. A further purpose is to provide a method of converting glycine into N-carboxyglycine anhydride.

It has now been found that the N-carboxy anhydride of glycine may readily be prepared by a simple direct procedure. The amino acid is first dispersed in glacial acetic acid and the mixture vigorously stirred by a suitable stirring device while adding an excess of hydrogen chloride. The progress of this reaction may be followed by the reaction temperature and as soon as the reaction temperature has subsided the reaction may be regarded as complete. When the reaction is complete, a stream of phosgene is bubbled into the reactor under anhydrous conditions until the slurry is converted into a clear solution. After filtering to remove insoluble impurities, the solution is concentrated and separated from the acetic acid by heating in a vacuum, at 30–60° C. The N-carboxyglycine anhydride is thereafter recovered in crystallized form.

The treatment of the reaction mixture with phosgene is conducted with conditions such that the phosgene is in gaseous state. Usually atmospheric pressure is desirable. The reaction temperature of 40 to 65° C. has been found to effect a fairly satisfactorily reaction, but optimum yields are produced with temperatures between 45 and 55° C.

An alternative procedure involves the use of glycine hydrochloride as the raw material, which may be prepared by reacting the glycine with hydrogen chloride in glacial acetic acid, or by any of the methods known to the prior art. In the practice of this procedure the glycine hydrochloride is suspended in glacial acetic acid and then treated with phosgene in the manner described in the preceding paragraph.

Since the N-carboxyglycine anhydride is extremely reactive with water, it is desirable to use anhydrous glacial acetic acid. Improved yields may also be secured by mixing the solution with dry substances which are non-solvents for N-carboxyglycine anhydride and which are otherwise inert.

The N-carboxyglycine anhydride prepared in accordance with this improved method is of unusual purity and may be used in the preparation of polypeptide resins or artificial polypeptide for food and medicinal uses.

Further details of this invention are set forth with respect to the following specific examples:

Example 1

Twenty parts by weight of glycine and 143 parts of glacial acetic acid were charged to a glass reaction vessel fitted with a drying tower, a thermometer, a propeller type stirrer and a gas inlet tube. With vigorous stirring at 2500 R. P. M., the mixture was heated to 40° C. by means of an electrically heated mantle. As soon as a thorough dispersion of the reactants had been achieved, the reaction mass was treated with an excess of gaseous hydrogen chloride, and the temperature rose to a maximum of 75° C. After about ten minutes the temperature began to drop slowly and the hydrochloric acid addition was continued until the temperature of the mixture reached 40° C. Phosgene was passed into the slurry until substantially all of the undissolved matter went into the solution. The resulting solution was then filtered and evaporated to remove a substantial part of the acetic acid. The solid crystalline material thereby obtained was identified as N-carboxyglycine anhydride.

The invention is defined by the following claims.

I claim:

1. A method of preparing N-carboxyglycine anhydride, which comprises contacting glycine with hydrochloric acid gas while suspended in a medium of glacial acetic acid, contacting the mixture so obtained with phosgene until substantially all of the suspended matter is dissolved, and separating the resulting compound by crystallization.

2. A method of preparing N-carboxyglycine anhydride, which comprises suspending glycine in glacial acetic acid, passing a stream of gaseous hydrogen chloride through the suspension, introducing phosgene into the suspension at 40 to 65° C. until the suspension is converted into a solution, evaporating the acetic acid at reduced pressures, and separating the N-carboxyglycine anhydride by crystallization.

3. A method of preparing N-carboxyglycine anhydride, which comprises suspending glycine in glacial acetic acid, treating the suspension with gaseous hydrogen chloride until the reaction is substantially complete, introducing phosgene into the reaction mixture under anhydrous conditions at a temperature between 45 and 55° C., concentrating the product by evaporation of acetic acid, and separating the resulting product by crystallization.

4. A method of preparing N-carboxyglycine anhydride, which comprises suspending glycine hydrochloride in glacial acetic acid, treating the suspension with phosgene until a homogeneous solution is formed, and separating the resultant N-carboxyglycine anhydride by crystallization.

5. A method of preparing N-carboxyglycine anhydride, which comprises suspending glycine hydrochloride in glacial acetic acid, passing a stream of gaseous phosgene through the suspension at 40 to 65° C. until the suspension is converted into a solution, evaporating the acetic acid, and separating the N-carboxyglycine anhydride by crystallization.

6. A method of preparing N-carboxyglycine anhydride, which comprises suspending glycine hydrochloride in glacial acetic acid, introducing phosgene into the reaction mixture under anhydrous conditions at a temperature between 45 and 55° C., concentrating the product by evaporation of acetic acid, and separating the resulting product by crystallization.

GEORGE A. RICHARDSON.

References Cited in the file of this patent

Nature, January 28, 1950, p. 152.
Nature, April 22, 1950, p. 647.